United States Patent
Minami

(10) Patent No.: US 11,404,725 B2
(45) Date of Patent: Aug. 2, 2022

(54) NON-AQUEOUS ELECTROLYTE SECONDARY BATTERY

(71) Applicant: Panasonic Intellectual Property Management Co., Ltd., Osaka (JP)

(72) Inventor: Hiroshi Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 283 days.

(21) Appl. No.: 16/725,085

(22) Filed: Dec. 23, 2019

(65) Prior Publication Data

US 2020/0136193 A1 Apr. 30, 2020

Related U.S. Application Data

(63) Continuation of application No. PCT/JP2018/017681, filed on May 8, 2018.

(30) Foreign Application Priority Data

Jun. 30, 2017 (JP) .............................. JP2017-128888

(51) Int. Cl.
| | |
|---|---|
| *H01M 50/597* | (2021.01) |
| *H01M 50/595* | (2021.01) |
| *H01M 10/052* | (2010.01) |
| *H01M 10/05* | (2010.01) |
| *H01M 4/134* | (2010.01) |
| *H01M 10/0587* | (2010.01) |
| *H01M 4/38* | (2006.01) |
| *H01M 4/40* | (2006.01) |
| *H01M 4/02* | (2006.01) |

(52) U.S. Cl.
CPC ....... *H01M 10/0587* (2013.01); *H01M 4/382* (2013.01); *H01M 4/405* (2013.01); *H01M 10/052* (2013.01); *H01M 2004/027* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0217577 | A1* | 9/2011 | Fukui ................ | H01M 10/052 429/94 |
| 2012/0028091 | A1* | 2/2012 | Park ................ | H01M 10/0587 429/94 |
| 2017/0346130 | A1* | 11/2017 | Maeda ............. | H01M 10/0525 |

FOREIGN PATENT DOCUMENTS

| | | |
|---|---|---|
| JP | 11-273708 A | 10/1999 |
| JP | 11-297349 A | 10/1999 |

(Continued)

OTHER PUBLICATIONS

International Search Report dated Jun. 12, 2018, issued in counterpart Application No. PCT/JP2018/017681, with English translation (4 pages).

*Primary Examiner* — Yoshitoshi Takeuchi
(74) *Attorney, Agent, or Firm* — WHDA, LLP

(57) ABSTRACT

A non-aqueous electrolyte secondary battery includes: an electrode group including a positive electrode, a negative electrode, and a separator interposed between the positive electrode and the negative electrode; a tape for securing at least a wound end of the electrode group; and a non-aqueous electrolyte. The negative electrode, at least in a charged state, includes a lithium metal and/or a lithium alloy. The tape has a tensile strength of 20 N/10 mm or less at an elongation ratio of 200% or more.

11 Claims, 5 Drawing Sheets

(56) References Cited

FOREIGN PATENT DOCUMENTS

| | | | |
|---|---|---|---|
| JP | 2001-243957 A | 9/2001 | |
| JP | 2011-204660 A | 10/2011 | |
| JP | 2017-112123 A | 6/2017 | |
| WO | 2014/027388 A1 | 2/2014 | |
| WO | WO-2016080143 A1 * | 5/2016 | .......... H01M 50/124 |

* cited by examiner

NON-AQUEOUS ELECTROLYTE SECONDARY BATTERY

TECHNICAL FIELD

The present invention relates to a non-aqueous electrolyte secondary battery including a wound electrode group.

BACKGROUND ART

In a non-aqueous electrolyte secondary battery such as a lithium secondary battery, a lithium metal is used as a negative electrode active material (Patent Literature 1). Also, a lithium alloy is sometimes used as the negative electrode active material. The lithium metal and the lithium alloy greatly develop and contract during charge and discharge, causing large changes in volume of the negative electrode.

On the other hand, in a non-aqueous electrolyte secondary battery including a wound electrode group, the electrode group is formed by spirally winding a positive electrode, a negative electrode, and a separator interposed therebetween. The wound end of the electrode group is secured by an unwinding prevention tape. The unwinding prevention tape is typically an adhesive tape having a base material made of polypropylene (PP). In Patent Literature 2, an adhesive tape with rubbery elasticity is used to secure the electrode group.

CITATION LIST

Patent Literature

[PTL 1] Japanese Laid-Open Patent Publication No. 2001-243957
[PTL 2] Japanese Laid-Open Patent Publication No. H11-297349

SUMMARY OF INVENTION

In the case of using a lithium metal, a lithium alloy, or other similar materials as the negative electrode active material in the negative electrode of the wound electrode group, the negative electrode greatly expands during charge. Since a PP adhesive tape is barely stretchable, when the electrode group is secured by a PP adhesive tape, the electrode group is increasingly compressed by the adhesive tape as the negative electrode expands, and the stress due to expansion of the negative electrode is unlikely to be reduced. This sometimes results in a crack in the electrode or in the current collector included in the electrode. In the case where the electrode group is secured by a tape with rubbery elasticity as in Patent Literature 2, the tape exerts a strong recovery force as the negative electrode contracts, and this recovery force is applied to the electrode group. This sometimes causes deflection of the electrode or of the current collector.

One aspect of the present invention relates to a non-aqueous electrolyte secondary battery, including: an electrode group including a positive electrode, a negative electrode, and a separator interposed between the positive electrode and the negative electrode; a tape for securing at least a wound end of the electrode group; and a non-aqueous electrolyte.

The negative electrode, at least in a charged state, includes a lithium metal and/or a lithium alloy.

The tape has a tensile strength of 20 N/10 mm or less at an elongation ratio of 200% or more.

In the non-aqueous electrolyte secondary battery, the occurrence of a crack in the electrode or the current collector during charge can be suppressed, and the deflection of the electrode or the current collector during discharge can be reduced.

DESCRIPTION OF EMBODIMENTS

Figure 1:
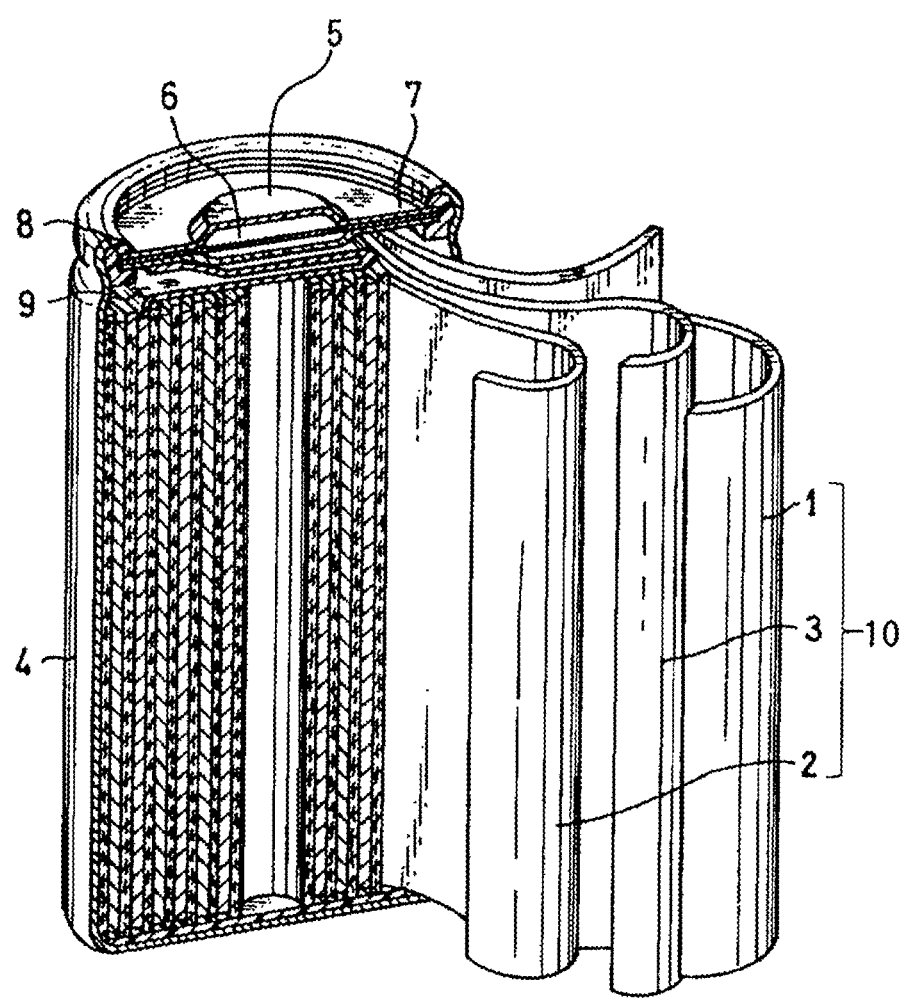
FIG. 1 A schematic vertical cross-sectional view of a non-aqueous electrolyte secondary battery according to an embodiment of the present invention.

A non-aqueous electrolyte secondary battery according to an embodiment of the present invention includes: an electrode group including a positive electrode, a negative electrode, and a separator interposed between the positive electrode and the negative electrode; a tape for securing at least a wound end of the electrode group (hereinafter sometimes referred to as group holding tape); and a non-aqueous electrolyte. The negative electrode, at least in a charged state, includes a lithium metal and/or a lithium alloy. The tape has a tensile strength of 20 N/10 mm or less at an elongation ratio of 200% or more (i.e., when the length is tripled or more).

In general, when a lithium metal and/or a lithium alloy is used as the negative electrode active material in the wound electrode group, the negative electrode expands by 10 vol % or more at an initial charge, but at the time of discharge, it contracts by only a half or less of the volume expanded. Therefore, when the conventional PP adhesive tape is used as a group holding tape for securing the electrode group, compression by the group holding tape is intensified as the negative electrode expands, and the stress associated with expansion of the negative electrode is unlikely to be reduced, which sometimes causes a crack in the electrode or the current collector (e.g., metal foil) included in the electrode group. On the other hand, when a tape with rubbery elasticity is used as the group holding tape, due to its rubbery elasticity, the tape having stretched following the expansion of the electrode group during charge contracts in association with contraction of the electrode group during discharge. The recovery force of the tape at this time is applied to the electrode group, which tends to cause deflection of the electrode or the current collector, or which sometimes forms a wrinkle. It is to be noted that, in the manufacturing process of a non-aqueous electrolyte secondary battery, in order to check the battery capacity, an assembled battery is subjected to a break-in charge and discharge (or preliminary charge and discharge). A charge performed for the first time in the break-in charge and discharge is an initial charge of the battery, and the expansion of the negative electrode at this time is typically particularly remarkable.

According to the above embodiment of the present invention, a tape having a tensile strength of 20 N/10 mm or less at an elongation ratio of 200% or more is used to secure at least the wound end of the electrode group. Therefore, despite using a lithium metal and/or a lithium alloy, i.e., a negative electrode active material whose volume change during charge and discharge is remarkable, compression by the tape is unlikely to be intensified even though the negative electrode expands during charge, and the stress associated with expansion of the negative electrode can be reduced. This can suppress the occurrence of a crack in the electrode or the current collector during charge. Furthermore, the above tape contracts moderately when the electrode group contracts during discharge and is unlikely to apply excessive recovery force to the electrode group. Therefore, the occurrence of deflection (or wrinkle) of the electrode or the current collector during discharge can be suppressed. As a result, deterioration in the charge and discharge characteristics and the output characteristics can be suppressed.

Note that the tensile strength (N/10 mm) of the tape is determined by measuring a strength (N) when the tape is pulled and stretched in the length direction to an elongation ratio of 200% or more, and converting the strength into a value per 10 mm width of the tape.

In the case of measuring a tensile strength of the group holding tape of the electrode group taken out from the battery, measurement is made at a portion of the tape on the side opposite to the wound end of the electrode group (specifically, the end of winding of the outermost layer). When the tape is not attached as far as on the side opposite to the wound end of the electrode group, the tensile strength can be measured at a farthermost portion of the tape from the wound end of the electrode group. This is because the influence of pulling the tape with the tension for securing the electrode group is small and negligible at these portions.

The tensile strength and the elongation ratio of the tape is measured with respect to the group holding tape of the electrode group taken out from the battery in an initial state.

The non-aqueous electrolyte secondary battery in an initial state refers to the battery immediately after assembly or the battery having undergone a break-in charge and discharge after assembled. The battery ready for delivery or a commercially available non-aqueous electrolyte secondary battery, those having been completely discharged, may be regarded as in an initial state.

The group holding tape preferably has a recovery ratio of 50% or less at an elongation ratio of 200%. Since the group holding tape has such a low recovery ratio when stretched greatly, it is possible, without impairing the function to secure the electrode group, to effectively reduce the stress associated with expansion and contraction of the electrode group during charge and discharge. This can further suppress the occurrence of a crack in the electrode and the current collector, as well as further reduce the deflection.

Note that when the group holding tape is pulled in the length direction of the tape until it is stretched to an elongation ratio of 200% (i.e., three times as long as the original length of the tape) and then released from this state, if the tape recovers to its original length, the recovery ratio is 100%. Accordingly, the recovery ratio being 50% or less at an elongation ratio of 200% means that the length of the tape measured upon release from the stretch in the length direction to an elongation ratio of 200% is in a state at an elongation ratio of 100% or more (i.e., twice or more as long as the original length of the tape).

The group holding tape preferably includes a base material sheet and an adhesive layer formed on one surface of the base material sheet, and the base material sheet preferably has streaky structures oriented so as to intersect with the length direction of the tape. With such streaky structures, the group holding tape is easily stretchable in the length direction, and can reduce the stress that occurs in association with expansion of the negative electrode during charge.

The streaky structures may be formed of polymer fibrils. The base material sheet may have ruggedness, and the ruggedness may form the streaky structures. In the case where such streaky structures are formed on the base material sheet, the group holding tape is more easily stretchable in the length direction, and can further reduce the stress associated with expansion during charge.

A length direction D1 of the group holding tape and an average direction D2 of the streaky structures preferably form an angle (acute angle) of 45° to 90°. The streaky structures are preferably formed at an interval of 0.5 to 10 mm. In these cases, the group holding tape is easily stretchable in the length direction even with a light force. Therefore, even though the electrode group expands, the group holding tape follows the expansion and hardly applies stress to the electrode group. Moreover, when the electrode group contracts, the tape is unlikely to apply excessive recovery force to the electrode group.

The average direction D2 of the streaky structures can be determined from an enlarged photograph of the group holding tape. Specifically, in an enlarged photograph of a surface of the base material sheet of the group holding tape, a square region R with a predetermined size is defined. Two opposite sides of the square are set to be parallel to the length direction of the tape. In the region R, a straight line connecting two points at which a certain streaky structure intersects with the above two opposite sides is referred to as the average direction of the streaky structure. With respect to randomly selected two or more (e.g., five) streaky structures, the average direction D2 of each structure is determined, and then, with respect to each structure, the angle (acute angle) formed between D1 and D2 is measured and averaged. The obtained average value (average angle) may be within the range above.

The interval between the streaky structures can also be determined from an enlarged photograph of the group holding tape. Specifically, in an enlarged photograph of a surface of the base material sheet of the group holding tape, the center-to-center distance between a randomly selected streaky structure and a streaky structure adjacent thereto is measured, and the measured distance is referred to as the interval between the streaky structures. The distance between adjacent streaky structures may be an average value obtained by measuring the distance with respect to randomly selected two or more (e.g., five) streaky structures, and averaging the measured values. The distance between adjacent streaky structures may be measured at a randomly selected point in each streaky structure.

The base material sheet included in the group holding tape preferably contains a fluorocarbon resin. The fluorocarbon resin preferably includes polytetrafluoroethylene. In these cases, it is possible to further reduce the stress associated with expansion and contraction during charge and discharge, while maintaining the moderate tape strength.

The group holding tape preferably has a thickness of 50 μm or less. With such a thickness, the tape is easily stretchable, and the stress during charge and discharge is likely to be effectively reduced.

The group holding tape is preferably attached by 0.8 turn or more around the outermost layer of the electrode group. In this case, the wound electrode group can be more reliably secured, and the stress associated with expansion and contraction of the electrode group is more likely to be reduced.

In a preferred embodiment, the negative electrode includes a negative electrode current collector. During charge, the lithium metal precipitates on the negative electrode current collector, or the lithium alloy is formed in a negative electrode material supported on the negative electrode current collector. The negative electrode current collector has a thickness of 20 µm or less. When the negative electrode current collector has such a thickness, the energy density of the battery can be improved.

A detailed description will be given below of the non-aqueous electrolyte secondary battery, with reference to the drawings as needed.

FIG. 1 is a schematic vertical cross-sectional view of a non-aqueous electrolyte secondary battery according to an embodiment of the present invention. The non-aqueous electrolyte secondary battery includes a bottomed cylindrical battery case 4 serving as a negative electrode terminal, an electrode group 10 housed in the battery case 4, and a non-aqueous electrolyte (not shown). The electrode group 10 includes a negative electrode 1, a positive electrode 2, and a separator 3 interposed therebetween, which are spirally wound together. At an opening of the battery case 4, a sealing plate 7 including a positive electrode terminal 5 and a safety valve 6 is disposed, via an electrically insulating gasket 8. An end portion of the opening of the battery case 4 is crimped inward, and thereby the non-aqueous electrolyte secondary battery is sealed. The sealing plate 7 is electrically connected to the positive electrode 2 via a positive electrode current collector plate 9.

Such a non-aqueous electrolyte secondary battery can be obtained by housing the electrode group 10 in the battery case 4, injecting the non-aqueous electrolyte, placing the sealing plate 7 at the opening of the battery case 4 via the insulating gasket 8, and crimp-sealing the end portion of the opening of the battery case 4. The negative electrode 1 of the electrode group 10, at its outermost layer, may be brought into contact with the battery case 4, so that they are electrically connected to each other. The positive electrode 2 of the electrode group 10 is electrically connected to the sealing plate 7 via the positive electrode current collector plate 9.

Figure 2:
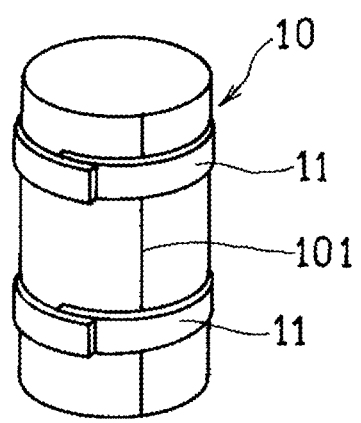
FIG. 2 A schematic oblique view of an electrode group of FIG. 1 secured by a tape (group holding tape).

FIG. 2 is a schematic oblique view of the electrode group of FIG. 1 secured by the group holding tape. A group holding tape 11 is attached around the outer periphery of the electrode group 10 at two places. The group holding tape 11 secures a wound end 101 of the electrode group 10. The group holding tape 11 is, as mentioned above, a tape having a tensile strength of 20 N/10 mm or less at an elongation ratio of 200% or more. The electrode group 10 with the wound end 101 secured by the group holding tape 11 is housed in the battery case 4 as shown in FIG. 1.

(Group Holding Tape 11)

The group holding tape 11 is attached to the outer periphery (i.e., peripheral surface) of the electrode group 10 so as to secure at least the wound end 101 of the electrode group 10.

The group holding tape 11, which has a tensile strength of 20 N/10 mm or less at an elongation ratio of 200% or more, is easily stretchable even with a light force, and has a small tensile strength even in a greatly stretched state (i.e., the recovery force is small). This allows the tape 11 to stretch following an expansion of the electrode group 10 during charge, and suppresses the tape from contracting excessively when the electrode group 10 contracts. In other words, the stress associated with expansion and contraction of the electrode group 10 tends to be reduced, and excessive application of the stress to the electrode group 10 due to contraction of the tape can be suppressed. Therefore, the occurrence of a crack in the electrode or the current collector during charge can be suppressed, and the occurrence of deflection of the electrode or the current collector during discharge can be reduced.

The group holding tape 11 preferably has a tensile strength of 20 N/10 mm or less at an elongation ratio of 220% or more, and more preferably has a tensile strength of 10 N/10 mm or less at an elongation ratio of 220% or more. In these cases, the occurrence of a crack in the electrode or the current collector during charge can be further suppressed, and the occurrence of deflection of the electrode or the current collector during discharge can be further reduced.

Excessive contraction of the tape 11 upon contraction of the electrode group 10 causes the electrode group 10 to be compressed by the tape 11, which is likely to result in deflection of the electrode or the current collector. Therefore, the tape 11 preferably has a recovery ratio of 50% or less, more preferably 35% or less or 30% or less, at an elongation ratio of 200%.

The group holding tape 11 secures at least the wound end 101 of the electrode group 10. To satisfy this, the group holding tape 11 may be attached so as to cover the wound end 101 and a portion therearound, or may be attached so as to wrap around the outer periphery of the electrode group 10 as in FIG. 2.

The group holding tape 11 is attached preferably by 0.8 turn or more, more preferably by 0.9 turn or more, around the outermost layer of the electrode group 10. In these cases, the wound electrode group can be more reliably secured, and the stress associated with expansion and contraction of the electrode group is more likely to be reduced. When the group holding tape is overlappingly wrapped, the thickness of the tape portion increases. Therefore, the length of the tape wrapped around the outer periphery of the electrode group preferably corresponds to 1.1 turns or less of the outer periphery of the electrode group 10.

The group holding tape 11 is attached at at least one place on the outer periphery (specifically, peripheral surface) of the electrode group 10, and may be attached at two or more places as in FIG. 2. The position at which the tape 11 is attached may be determined according to the size of the electrode group 10, the width and length of the tape 11, and others.

The group holding tape 11 usually includes a base material sheet and an adhesive layer formed on one surface of the base material sheet. The group holding tape 11 is attached, with the adhesive layer inside, so that the adhesive layer comes in contact with the peripheral surface of the electrode group 10.

The adhesive layer is formed of an adhesive material. Any known adhesive material used for securing the electrode group may be used. Examples of the adhesive material include rubber-based adhesives, acrylic-based adhesives, silicone-based adhesives, and urethane-based adhesives.

The base material sheet is formed of, for example, a polymer, such as resin. Examples of the resin include a fluorocarbon resin, a cellulose derivative (e.g. cellulose ester, cellulose ether), a polyester resin, an olefin resin, a silicone resin, and a polyvinyl chloride. Preferred among them is a fluorocarbon resin in view of maintaining the moderate tape strength, and reducing the stress associated with expansion and contraction during charge and discharge. Examples of the fluorocarbon resin include polytetrafluoroethylene, a copolymer containing a tetrafluoroethylene unit, polyvinylidene fluoride, and a copolymer containing a vinylidene fluoride unit. Preferred among them is polytetrafluoroethylene.

The base material sheet may contain one or more kinds of these polymers.

In a preferred embodiment, the base material sheet has streaky structures oriented so as to intersect with the length direction of the tape 11. Such structures allow the tape 11 to be easily stretchable in the length direction, as well as to exhibit weak recovery force after stretched. The streaky structures may be formed of polymer fibrils or may be ruggedness. The streaky structures may be formed, for example, by drawing the base material sheet or by cutting the bulk polymer when forming the base material sheet.

A length direction D1 of the tape 11 and an average direction D2 of the streaky structures on the base material sheet form an angle of preferably 45° to 90°, more preferably 60° to 90°. When the angle is in such a range, the tape 11 is easily stretchable in the length direction even with a light force, and can easily follow an expansion of the electrode group 10. Furthermore, when the electrode group 10 contracts, the recovery force of the tape 11 is unlikely to be excessively applied to the electrode group 10.

The streaky structures are preferably formed at an interval of 0.5 to 10 mm, and may be formed at an interval of 1 to 7 mm. When the interval is in such a range, the tape 11 is easily stretchable in the length direction even with a light force, and can easily follow an expansion of the electrode group 10. Furthermore, when the electrode group 10 contracts, the recovery force of the tape 11 is unlikely to be excessively applied to the electrode group 10.

The tape 11 has a thickness of preferably 50 μm or less, more preferably 40 μm or less. With such a thickness, the tape 11 is easily stretchable, and the stress applied to the electrode group 10 tends to be reduced.

(Electrode Group 10)

The electrode group 10 includes the positive electrode 2, the negative electrode 1, and the separator 3 interposed therebetween, and is a wound electrode group in which they are wound together. The electrode group 10 is secured at at least the wound end by the group holding tape 11.

(Negative Electrode 1)

The negative electrode 1, at least in a charged state, includes a lithium metal and/or a lithium alloy. They serve as a negative electrode active material.

In the case of a lithium metal, a lithium metal precipitates on the negative electrode 1 (e.g., negative electrode current collector) during charge, and lithium ions leach out from the negative electrode 1 during discharge, through which capacity is obtained. In the case of a lithium alloy, lithium is absorbed (or intercalated) into the negative electrode 1 (specifically, into the negative electrode material included in the negative electrode 1) during charge, to form a lithium alloy, and lithium ions are released from the negative electrode 1 (specifically, from the negative electrode material), through which capacity is obtained. In either case, in the battery in an initial state or in a completely discharged state, the negative electrode 1 may contain no lithium. When the negative electrode active material is a lithium metal, in an initial state of the battery, the negative electrode 1 may contain no lithium metal.

Examples of the negative electrode material (first negative electrode material) that absorbs lithium to form a lithium alloy include silicon, silicon compounds (e.g., oxides), tin, tin compounds (e.g., oxides), aluminum, zinc, and magnesium. These negative electrode materials are capable of reversibly absorb and release lithium. Examples of the lithium alloy include alloys of these negative electrode materials and lithium (including alloy-containing compounds). These negative electrode materials are, in general, sometimes called an active material.

The negative electrode 1 may include, if necessary, another negative electrode material (second negative electrode material) that reversibly absorbs and releases lithium. The second negative electrode material is, for example, a carbon material. Examples of the carbon material include graphite and amorphous carbon. The second negative electrode material may be used singly or in combination of two or more kinds. Preferably, the first negative electrode material is used in combination with a carbon material. The ratio of the carbon material to the total amount of the first and second negative electrode materials is, for example, 20 to 95 mass %, and may be 50 to 95 mass %.

The negative electrode 1, at least in a charged state, includes a negative electrode current collector, and may include a negative electrode current collector and a negative electrode active material layer supported on the negative electrode current collector. The negative electrode active material layer contains a negative electrode active material or a negative electrode material, and sometimes contains a negative electrode active material and a negative electrode material. The negative electrode material herein includes at least a first negative electrode material, and may include a first negative electrode material and a second negative electrode material. The negative electrode active material layer may be a vapor phase deposition film of a first negative electrode material. The deposition film can be formed by depositing the first negative electrode material on a surface of the negative electrode current collector by a gas phase method, such as a vacuum vapor deposition method. The negative electrode active material layer may be a negative electrode mixture layer including a negative electrode active material and/or a first negative electrode material, a binder, and, if necessary, an electrically conductive material and/or a thickener. The negative electrode mixture layer can be formed by mixing constituent components of the negative electrode mixture layer, such as a negative electrode active material, with a dispersion medium, to prepare a slurry, and applying the slurry onto the negative electrode current collector, followed by drying and pressing in the thickness direction.

The binder may be, for example, a fluorocarbon resin, a vinyl cyanide resin, an acrylic resin, a polyolefin resin, a polyamide resin, a polyimide resin, and/or a rubbery material. The conductive agent may be, for example, carbon black, graphite, carbon fiber, and/or carbon fluoride. The thickener may be, for example, carboxymethyl cellulose or a salt thereof, polyethylene glycol, and/or polyvinyl alcohol. The dispersion medium is not limited to a particular one, and may be, for example, water, an alcohol such ethanol, an ether such as tetrahydrofuran, an amide such as dimethylformamide, N-methyl-2-pyrrolidone, or a mixed solvent thereof.

The negative electrode current collector may be a metal foil, or a porous substrate, such as punching sheet or expanded metal. Examples of the material of the negative electrode current collector include copper, copper alloys, stainless steel, nickel, and nickel alloys.

The thickness of the negative electrode current collector is, for example, 50 μm or less, preferably 20 μm or less, more preferably 15 μm or less. When the negative electrode current collector has such a thickness, the occurrence of a crack (or break) in the electrode and the current collector in the electrode group can be suppressed, and the energy density of the battery can be increased. The thickness of the negative electrode current collector is, for example, 5 μm or more.

When the negative electrode active material is a lithium metal, if necessary, a protective layer may be formed on a surface of the negative electrode current collector. The protective layer preferably contains a solid electrolyte, an organic substance, and/or an inorganic substance.

Examples of the solid electrolyte include sulfide-based, phosphoric acid-based, perovskite-based, and garnet-based solid electrolytes. The solid electrolyte preferably has lithium ion conductivity. Preferred among them are a sulfide-based solid electrolyte and/or a phosphoric acid-based solid electrolyte. Examples of the sulfide-based solid electrolyte include $Li_2S-P_2S_5$, $70Li_2S-30P_2S_5$, $80Li_2S-20P_2S_5$, $Li_2S-SiS_2$, and $LiGe_{0.25}P_{0.75}S_4$. Examples of the phosphoric acid-based solid electrolyte include $Li_{1+X}Al_XTi_{2-X}(PO_4)_3$ (0≤X<2, preferably 0<X≤1), such as $Li_{1.5}Al_{0.5}Ti_{1.5}(PO_4)_3$, and $Li_{1+X}Al_XGe_{2-X}(PO_4)_3$ (0<X<2, preferably 0<X≤1).

The organic substance and the inorganic substance also preferably have lithium ion conductivity. Examples of the organic substance include polyethylene oxide and polymethyl methacrylate. Preferred examples of the inorganic substance are ceramic materials, such as $SiO_2$, $Al_2O_3$, and MgO.

(Positive Electrode 2)

The positive electrode 2 includes a positive electrode active material, such as a lithium-containing transition metal compound. The positive electrode usually includes a positive electrode current collector and a positive electrode active material (or positive electrode active material layer) supported on the positive electrode current collector. The positive electrode active material layer preferably contains a positive electrode active material and a binder, and, if necessary, may further contain a thickener, an electrically conductive agent, or the like. The binder, the conductive agent, and the thickener can be each selected from those exemplified for the negative electrode 1.

Examples of the positive electrode current collector include those exemplified for the negative electrode current collector. Examples of the material of the positive electrode current collector include stainless steel, titanium, aluminum, and aluminum alloys.

Examples of the transition metal element contained in the lithium-containing transition metal compound include Co, Ni, and Mn. These transition metals may be partially replaced with a different element. The different element may be at least one selected from the group consisting of Na, Mg, Ca, Sc, Y, Ti, Zr, V, Cr, W, Fe, Cu, Zn, Al, Ga, Ge, Sn, Pb, Sb, and Bi. The positive electrode active material may be used singly or in combination of two or more kinds.

Specific examples of the positive electrode active material include $Li_xNi_yM_zMe_{1-(y+z)}O_{2+d}$, $Li_xM_yMe_{1-y}O_{2+d}$, and $Li_xMn_2O_4$. M represents at least one element selected from the group consisting of Co and Mn. Me is the above different element and represents at least one element selected from the group consisting of Al, Cr, Fe, Mg, and Zn. In the above formulae, x satisfies 0.98≤x≤1.2, y satisfies 0.3≤y≤1, and z satisfies 0≤z≤0.7. Here, y+z satisfies 0.9≤(y+z)≤1. d satisfies −0.01≤d≤0.01.

The positive electrode 2 can be formed by preparing a slurry containing constituent components of the positive electrode active material layer, such as a positive electrode active material, and applying the slurry onto a surface of the positive electrode current collector, followed by drying and pressing in the thickness direction. The slurry usually contains a dispersion medium. Examples of the dispersion medium include those exemplified for the negative electrode 1.

(Separator 3)

The separator 3 may be, for example, a porous membrane (porous film) or a non-woven fabric. Examples of the material constituting the separator 3 include polyolefin resin, polyamide resin, polyimide resin, and cellulose. The porous film may contain inorganic particles, if necessary. The separator may be of a single- or multi-layered structure.

The thickness of the separator 3 is, for example, 5 to 100 μm.

(Non-Aqueous Electrolyte)

The non-aqueous electrolyte includes, for example, a non-aqueous solvent and a lithium salt dissolved in the non-aqueous solvent. The concentration of the lithium salt in the non-aqueous electrolyte is, for example, 0.5 to 2 mol/L. The non-aqueous electrolyte may contain a known additive.

Examples of the non-aqueous solvent include cyclic carbonic acid esters, chain carbonic acid esters, and cyclic carboxylic acid esters. Examples of the cyclic carbonic acid esters include propylene carbonate (PC) and ethylene carbonate (EC). Examples of the chain carbonic acid esters include diethyl carbonate (DEC), ethyl methyl carbonate (EMC), and dimethyl carbonate (DMC). Examples of the cyclic carboxylic acid esters include γ-butyrolactone (GBL) and γ-valerolactone (GVL). The non-aqueous solvent may be used singly or in combination of two or more kinds.

Examples of the lithium salt include lithium salts of chlorine-containing acid (e.g., $LiClO_4$, $LiAlCl_4$, $LiB_{10}Cl_{10}$), lithium salts of fluorine-containing acid (e.g., $LiPF_6$, $LiBF_4$, $LiSbF_6$, $LiAsF_6$, $LiCF_3SO_3$, $LiCF_3CO_2$), lithium salts of fluorine-containing acid imide (e.g., $LiN(CF_3SO_2)_2$, $LiN(CF_3SO_2)(C_4F_9SO_2)$, $LiN(C_2F_5SO_2)_2$), and lithium halide (e.g., LiCl, LiBr, LiI).

A lithium salt having an oxalate complex as an anion is also preferable. When such a lithium salt is used, in the case where the negative electrode active material is a lithium metal, even though the negative electrode contains no lithium metal in an initial state, a lithium metal coating tends to be uniformly formed on a surface of the negative electrode current collector during charge, allowing charge and discharge to proceed stably. The lithium salt having an oxalate complex as an anion preferably contains boron and/or phosphorus. Specific examples of such a lithium salt include lithium bis(oxalate)borate (LiBOB, $LiB(C_2O_4)_2$), $LiBF_2(C_2O_4)$, $LiPF_4(C_2O_4)$, and $LiPF_2(C_2O_4)_2$. Preferred among them is $LiBF_2(C_2O_4)$.

The lithium salt may be used singly or in combination of two or more kinds. The lithium salt having an oxalate complex as an anion may be used in combination with one or more other lithium salts. The lithium salt having an oxalate complex as an anion decomposes on the negative electrode 1. Analyzing the decomposed components, for example, the film composition on the negative electrode 1, can determine whether there was addition to the electrolyte or not and the added amount.

(Others)

The non-aqueous electrolyte secondary battery is not particularly limited as long as it includes the wound electrode group 10 as described above, and may have any shape, for example, a cylindrical shape or a prismatic shape. The shape of the electrode group 10 is dependent on the shape of the battery or the battery case, and may be a cylindrical shape or a flat shape whose end face perpendicular to the winding axis is oval.

The non-aqueous electrolyte secondary battery can be produced by a conventional method, depending on the battery shape and others. A cylindrical battery or a prismatic battery can be produced by, for example, winding the positive electrode 2, the negative electrode 1, and the separator 3 for separating the positive electrode 2 from the negative electrode 1, into the electrode group 10, then securing it at at least the wound end by the group holding tape 11, and housing the electrode group 10 and the non-aqueous electrolyte into the battery case 4.

The battery case 4 may be made of a laminate film or a metal. Examples of the material of a metal battery case include aluminum, aluminum alloys (e.g., an alloy containing a metal such as manganese or copper in a small amount), and steel sheet.

EXAMPLES

The present invention will be specifically described below with reference to Examples and Comparative Examples. The present invention, however, is not limited to the following Examples.

Example 1

(1) Production of Positive Electrode 2

A lithium-containing transition metal oxide containing aluminum, nickel, and cobalt and serving as a positive electrode active material was mixed with acetylene black and polyvinylidene fluoride in a ratio of 95:2.5:2.5, to which an appropriate amount of N-methyl-2-pyrrolidone was added and stirred, to prepare a positive electrode slurry. Subsequently, the positive electrode slurry was applied onto both surfaces of an aluminum foil serving as a positive electrode collector, and the applied film was dried, which was then pressed in the thickness direction with rollers, and cut in a predetermined electrode size, to give a positive electrode 2. An aluminum tab was attached to the positive electrode 2.

(2) Production of Negative Electrode 1

An electrolytic copper foil (thickness: 10 μm) serving as a negative electrode current collector was cut in a predetermined electrode size, to give a negative electrode 1. A nickel tab was attached to the negative electrode 1.

(3) Preparation of Non-Aqueous Electrolyte

Ethylene carbonate and dimethyl carbonate were mixed in a volume ratio of 3:7. $LiPF_6$ and $LiBF_2$ ($C_2O_4$) were dissolved in the resultant mixed solvent at a concentration of 1.0 mol/L and 0.1 mol/L, respectively, to prepare a non-aqueous electrolyte.

(4) Fabrication of Battery

Figure 3:
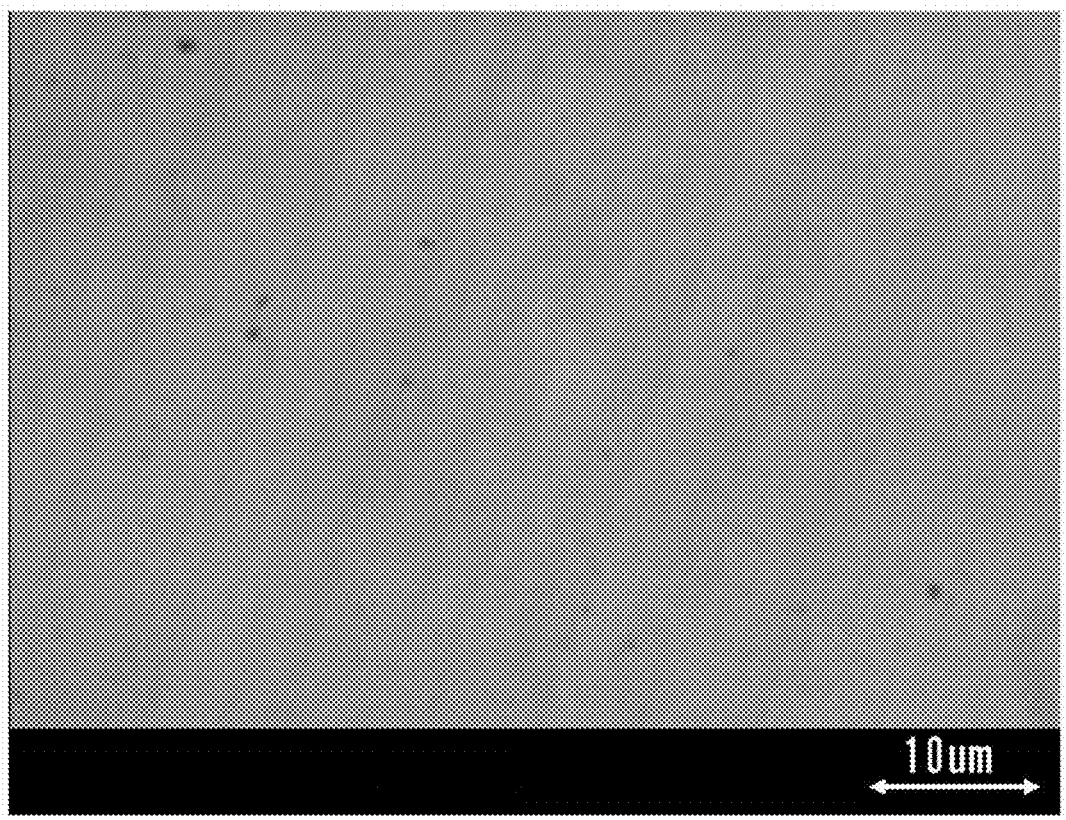
FIG. 3 An enlarged photograph of a surface of the group holding tape used in Example 1, taken from a base material sheet side.

The positive electrode 2 and the negative electrode 1 obtained in (1) and (2) above were spirally wound, in an inert gas atmosphere, with a polyethylene porous membrane serving as a separator 3 therebetween, to give a wound electrode group 10. On the outer periphery of the wound electrode group 10, a wound end 101 was secured with a group holding tape 11 (thickness: 30 μm, width: 10 mm). The group holding tape 11 was attached around the outer periphery of the electrode group 10 at two places, each by about one turn as shown in FIG. 2. The group holding tape 11 had a base material sheet made of polytetrafluoroethylene. An enlarged photograph of a surface of the group holding tape 11 used in Example 1 taken from the base material sheet side is shown in FIG. 3. In FIG. 3, the lateral direction corresponds to the length direction of the tape 11. As shown in FIG. 3, the base material sheet of the group holding tape 11 has streaky structures oriented so as to intersect with the length direction of the tape 11. The distance between the steaky structures was measured at optional 4 points, which was 1.03 to 5.31 mm.

The obtained electrode group 10 was housed in a cylindrical outer package (battery case), into which the non-aqueous electrolyte prepared in (3) was injected. The opening of the outer package was then sealed, to complete a non-aqueous electrolyte secondary battery T1.

Subsequently, the fabricated battery T1 was subjected to a break-in charge and discharge under the following conditions.

Charge: Constant-current charged at a current of 0.1 It until the battery voltage reached 4.3 V, and then constant-voltage charged at a constant voltage of 4.3 V until the current value reached 0.01 It.

Discharge: Discharged at a current of 0.1 It until the battery voltage reached 2.5 V.

(5) Evaluation (a) Tensile Strength and Elongation Ratio of Group Holding Tape 11

The battery after the break-in charge and discharge was disassembled, to take out the electrode group 10, from which the group holding tape 11 was removed. The group holding tape 11 was cut in 2 cm long so as to include a portion on the side opposite to the wound end 101 of the electrode group 10, to prepare a sample for tensile strength measurement.

The sample was pulled in the length direction (the length direction of the tape), to measure a tensile strength at an elongation ratio of 200% or more. When it was difficult to pull the sample to an elongation ratio of 200%, the sample was pulled to the maximum possible extent, at which point the elongation ratio and the tensile strength were measured.

(b) Recovery Ratio of Group Holding Tape 11

A 2-cm-long sample prepared similarly to (a) above was pulled in the length direction (the length direction of the tape) until it was stretched to a length of 6 cm. The length of the sample upon release from the stretch was measured, and a recovery ratio was calculated from a following equation.

$$\text{Recovery ratio } (\%) = (L_1 - L_2)/(L_1 - L_0) \times 100$$

(In the equation, $L_0$ represents the initial length of the sample, $L_1$ represents the length of the sample when pulled until it was stretched to an elongation ratio of 200%, and $L_2$ represents the length of the sample after the stretch was released).

In the case of the battery T1, the sample having been stretched to 6 cm, upon release from the stretch, contracted to a length of 4.8 cm. The recovery ratio was calculated as (6 cm−4.8 cm)/(6 cm−2 cm)×100=30%.

(c) Cracks and Deflection in Electrode and Current Collector

A cross-sectional photograph of the electrode group along a direction perpendicular to the winding axis of the electrode group of the battery after the break-in charge and discharge was taken with an X-ray CT scanner, to check for cracks and deflection in the electrode group. The results were rated according to the following criteria.

A: No crack was observed. No deflection was found, or only a slight deflection was found.

B: A crack was observed. Noticeable deflection was found at more than one place.

Examples 2 to 3 and Comparative Examples 1 to 2

Non-aqueous electrolyte secondary batteries were fabricated and evaluated in the same manner as in Example 1, except that the group holding tape 11 was replaced with one having a tensile strength as shown in Table 1 at an elongation ratio as shown in Table 1. Note that the group holding tape used in the Comparative Example 1 was the conventional one having a PP base material.

Example 4

A negative electrode material, a Na salt of carboxymethyl cellulose serving as a thickener, and styrene-butadiene rubber serving as a binder were mixed in a mass ratio of 100:1:1 in an aqueous solution, to prepare a negative electrode slurry. For the negative electrode material, artificial graphite (second negative electrode material) and SiO (first negative electrode material) were used in a mass ratio of 90:10. The prepared negative electrode slurry was applied onto an electrolytic copper foil (thickness: 10 μm) serving as a negative electrode current collector. The applied film was dried, and then pressed in the thickness direction with rollers, followed by cutting in a predetermined electrode size, into the negative electrode 1. A nickel tab was attached to the negative electrode 1.

A non-aqueous electrolyte secondary battery was fabricated and evaluated in the same manner as in Example 1, except that the negative electrode 1 thus produced was used.

The results of Examples and Comparative Examples are shown in Table 1. Examples 1 to 4 are denoted as T1 to T4, respectively, and Comparative Examples 1 and 2 are denoted as R1 and R2, respectively.

TABLE 1

| | Negative electrode active material or negative electrode material | Group holding tape | | | |
|---|---|---|---|---|---|
| | | Tensile strength (N/10 mm) | Elongation ratio (%) | Recovery ratio (%) | Crack • Deflection |
| R1 | Li metal | 30 | 190 | Broken | B |
| R2 | Li metal | 19 | 140 | Broken | B |
| T1 | Li metal | 8 | 230 | 30 | A |
| T2 | Li metal | 14 | 200 | 5 | A |
| T3 | Li metal | 20 | 230 | 35 | A |
| T4 | Graphite-SiO | 8 | 230 | 30 | A |

Table 1 shows that, in Comparative Examples, a crack was formed, and noticeable deflection occurred at more than one place in the electrode or the current collector after the break-in charge and discharge. In contrast, in Examples, no crack was formed, and no deflection or only a slight deflection occurred in the electrode or the current collector after the break-in charge and discharge.

Figure 4:
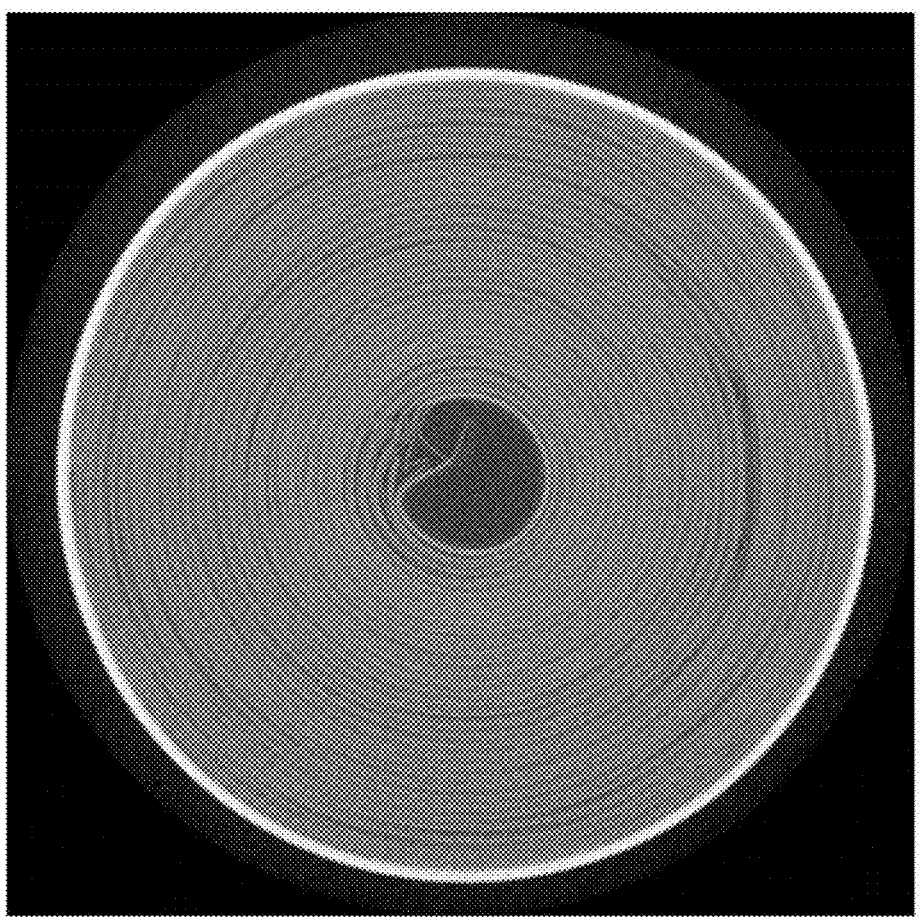
FIG. 4 An X-ray CT image of a cross section of a non-aqueous electrolyte secondary battery of Example 1 after a break-in charge and discharge.
Figure 5:
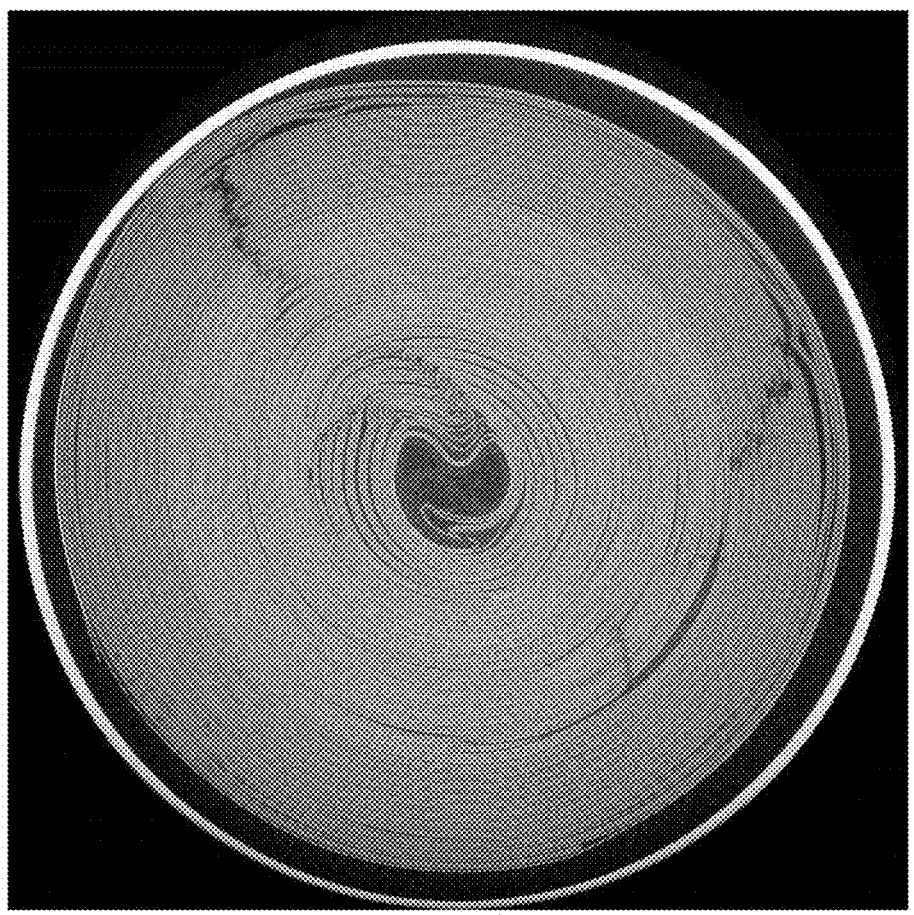
FIG. 5 An X-ray CT image of a cross section of a non-aqueous electrolyte secondary battery of Comparative Example 1 after the break-in charge and discharge.

With respect to the non-aqueous electrolyte secondary battery of Example 1, an X-ray CT image of its cross section after the break-in charge and discharge is shown in FIG. 4. With respect to the non-aqueous electrolyte secondary battery of Comparative Example 1, an X-ray CT image of its cross section after the break-in charge and discharge is shown in FIG. 5. As shown in FIG. 5, in the battery of Comparative Example 1 after the break-in charge and discharge, cracks and noticeable deflection at more than one place were detected in the electrode or the current collector. In contrast, as shown in FIG. 4, in the battery of Example 1, no crack was found and no noticeable deflection was observed in the electrode or the current collector after the break-in charge and discharge.

INDUSTRIAL APPLICABILITY

In the non-aqueous electrolyte secondary battery according to the present invention, the occurrence of a crack can be suppressed and the occurrence of deflection can be reduced in the electrode or the current collector during charge and discharge, and therefore, the charge and discharge characteristics and the output characteristics are unlikely to deteriorate. Therefore, the non-aqueous electrolyte secondary battery is suitably applicable for various electronic devices, such as cellular phones, personal computers, digital still cameras, game machines, and portable audio players.

REFERENCE SIGNS LIST

1: negative electrode
2: positive electrode
3: separator
4: battery case
5: positive electrode terminal
6: safety valve
7: sealing plate
8: insulating gasket
9: positive electrode current collector plate
10: wound electrode group
11: tape
101: wound end

The invention claimed is:

1. A non-aqueous electrolyte secondary battery, comprising:
an electrode group including a positive electrode, a negative electrode, and a separator interposed between the positive electrode and the negative electrode; a tape for securing at least a wound end of the electrode group; and a non-aqueous electrolyte,
the negative electrode, at least in a charged state, including a lithium metal and/or a lithium alloy,
the tape having a tensile strength of 20 N/10 mm or less at an elongation ratio of 200% or more,
wherein the tape includes a base material sheet and an adhesive layer formed on one surface of the base material sheet,
the base material sheet has streaky structures oriented so as to intersect with a length direction of the tape, and
the streaky structures are formed at an interval of 0.5 to 10 mm.

2. The non-aqueous electrolyte secondary battery of claim 1, wherein the tape has a recovery ratio of 50% or less at an elongation ratio of 200%.

3. The non-aqueous electrolyte secondary battery of claim 1, wherein the streaky structures are formed of polymer fibrils.

4. The non-aqueous electrolyte secondary battery of claim 1, wherein
the base material sheet has ruggedness, and
the ruggedness forms the streaky structures.

5. The non-aqueous electrolyte secondary battery of claim 1, wherein a length direction D1 of the tape and an average direction D2 of the streaky structures form an angle of 45° to 90°.

6. The non-aqueous electrolyte secondary battery of claim 1, wherein the base material sheet contains a fluorocarbon resin.

7. The non-aqueous electrolyte secondary battery of claim 6, wherein the fluorocarbon resin includes polytetrafluoroethylene.

8. The non-aqueous electrolyte secondary battery of claim 1, wherein the tape has a thickness of 50 μm or less.

9. The non-aqueous electrolyte secondary battery of claim 1, wherein the tape is attached by 0.8 turn or more around an outermost layer of the electrode group.

10. The non-aqueous electrolyte secondary battery of claim 1, wherein
- the negative electrode includes a negative electrode current collector,
- the lithium metal precipitates on the negative electrode current collector, or the lithium alloy is formed in a negative electrode material supported on the negative electrode current collector, during charge, and
- the negative electrode current collector has a thickness of 20 μm or less.

11. The non-aqueous electrolyte secondary battery of claim 1, wherein the negative electrode, at least in a charged state, includes the lithium metal, and in an initial state, does not include the lithium metal.

* * * * *